(12) United States Patent
Nakamura et al.

(10) Patent No.: US 8,167,381 B2
(45) Date of Patent: May 1, 2012

(54) BRAKE FLUID PRESSURE CONTROL DEVICE FOR BAR HANDLE VEHICLE

(75) Inventors: Motoyasu Nakamura, Nagano (JP); Takayuki Hamanaka, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 547 days.

(21) Appl. No.: 12/367,642

(22) Filed: Feb. 9, 2009

(65) Prior Publication Data

US 2009/0206653 A1 Aug. 20, 2009

(30) Foreign Application Priority Data

Feb. 14, 2008 (JP) .............................. P. 2008-032582

(51) Int. Cl.
*B60T 13/128* (2006.01)
*B60T 8/42* (2006.01)
*B60T 11/16* (2006.01)

(52) U.S. Cl. ................ 303/9.61; 303/115.1; 188/106 P; 188/345; 188/359; 188/344

(58) Field of Classification Search ................. 303/6.01, 303/9.61, 9.62, 9.64, 114.1, 115.1, 116.4, 303/137, 113.2; 188/105, 106 R, 106 P, 344, 188/345, 358, 359, 355

See application file for complete search history.

(56) References Cited

U.S. PATENT DOCUMENTS

| | | | | |
|---|---|---|---|---|
| 5,219,211 A | * | 6/1993 | Tsuchida et al. | 303/9.64 |
| 5,273,346 A | * | 12/1993 | Tsuchida et al. | 303/9.64 |
| 5,275,476 A | * | 1/1994 | Maisch | 303/113.2 |
| 5,372,408 A | * | 12/1994 | Tsuchida et al. | 303/9.64 |
| 5,564,534 A | * | 10/1996 | Toyoda et al. | 303/9.64 |
| 5,758,928 A | * | 6/1998 | Kobayashi et al. | 188/346 |
| 6,615,955 B2 | * | 9/2003 | Jakovljevic | 188/344 |
| 2005/0168062 A1 | * | 8/2005 | Nishikawa et al. | 303/20 |

FOREIGN PATENT DOCUMENTS

DE 35 41 313 5/1987

(Continued)

OTHER PUBLICATIONS

European Office Action for Corresponding European Application No. 09 152 557.6-2423, dated Mar. 21, 2011 (English translation).

(Continued)

*Primary Examiner* — Thomas J Williams
(74) *Attorney, Agent, or Firm* — Andrew M. Calderon; Roberts Mlotkowski Safran & Cole, P.C.

(57) ABSTRACT

A brake fluid pressure control device for a bar handle vehicle has a front wheel brake system which imparts a braking force to a front wheel and a rear wheel brake system which imparts a braking force to a rear wheel. At least one of the brake systems has a master cylinder which generates brake fluid pressure in accordance with an operation amount of a brake operation element, first and second wheel cylinders both of which impart the brake force on one of the front and rear wheels, a first hydraulic path which communicates the master cylinder with the first wheel cylinder, a second hydraulic path which is branched from the first hydraulic path and connected to the second wheel cylinder and a boosting unit which boosts the brake fluid pressure in the second wheel cylinder without boosting the brake fluid pressure in the first wheel cylinder.

16 Claims, 6 Drawing Sheets

FOREIGN PATENT DOCUMENTS

| | | |
|---|---|---|
| DE | 10 2005 041 281 | 3/2006 |
| EP | 0210421 | 6/1986 |
| EP | 0 518 375 | 6/1992 |
| EP | 1 277 635 | 7/2002 |
| EP | 1 808 347 | 10/2004 |
| JP | 60-143173 | 7/1985 |
| JP | 4-368267 | 12/1992 |
| JP | 9-11965 | 1/1997 |
| JP | 9-202281 | 8/1997 |
| JP | 11-34833 | 2/1999 |
| JP | 2000-71963 | 3/2000 |
| JP | 2000-264278 | 9/2000 |
| JP | 2001-301595 | 10/2001 |
| JP | 2001-180462 | 7/2003 |
| JP | 2004-231112 | 8/2004 |
| JP | 2007-69906 | 3/2007 |
| JP | 2007-269292 | 10/2007 |
| JP | 2007-269293 | 10/2007 |

OTHER PUBLICATIONS

Office Action for Corresponding Japanese Application No. 2008-032582.

European Search Report for Corresponding Application No. EP 09152557.6.

* cited by examiner

BRAKE FLUID PRESSURE CONTROL DEVICE FOR BAR HANDLE VEHICLE

BACKGROUND OF THE INVENTION

1. Field of the Invention

The present invention relates to a brake fluid pressure control device for a bar handle vehicle.

2. Description of Related Art

As a hydraulic circuit of a brake fluid pressure control device which is mainly used for a bar handle-type vehicle (hereafter simply referred to as the "bar handle vehicle"), such as a two-wheeled motor vehicle, a three-wheeled motor vehicle, and an all terrain vehicle (ATV), one is known which is capable of effecting a brake control in which wheel brakes for front and rear wheels are interlocked (hereafter referred to as interlocked brake control), in addition to antilock brake control for each wheel brake (e.g., refer to Japanese Patent Unexamined Publications JP-A-2000-71963 and JP-A-2007-69906).

The known hydraulic circuit has a brake system for braking one of the front and rear wheel brakes (e.g., the rear wheel brake) and a brake system for braking the other wheel brake (e.g., the front wheel brake). Each brake system is provided with electromagnetic valves and pumps for executing the antilock brake control and interlocked brake control.

In the a brake fluid pressure control device for a bar handle vehicle in the JP-A-2000-71963, for instance, when a brake operation element of the rear wheel is operated, a pump of the front wheel brake system is operated by the interlocked brake control to boost the pressure in a hydraulic path connected to the front wheel brake. However, when the brake operation element of the front wheel is additionally operated in such a state, since the pressure in the hydraulic path has been already boosted, the reaction force in the operation of the brake operation element is large, thereby unfavorably imparting a "rigid feeling" to the driver.

Incidentally, JP-A-2007-69906 aims to suppress the "rigid feeling" produced in the brake fluid pressure control device for the bar handle vehicle in the JP-A-2000-71963. However, its resolving means is to ensure not to perform the interlocked brake control to the front wheel brake, and is not designed to improve the operational feeling at the time of an additional operation while performing the interlocked brake control.

SUMMARY OF THE INVENTION

Accordingly, an object of the invention is to provide a brake fluid pressure control device for a bar handle vehicle which is capable of improving the operational feeling when a brake operation element is additionally operated during the interlocked brake control.

To attain the above object, according to an aspect of the invention, there is provided a brake fluid pressure control device for a bar handle vehicle including:

a front wheel brake system which imparts a braking force to a front wheel; and a rear wheel brake system which imparts a braking force to a rear wheel, wherein at least one of the brake systems includes:

a master cylinder which generates brake fluid pressure in accordance with an operation amount of a brake operation element;

first and second wheel cylinders both of which impart the brake force on one of the front and rear wheels;

a first hydraulic path which communicates the master cylinder with the first wheel cylinder;

a second hydraulic path which is branched from the first hydraulic path and connected to the second wheel cylinder; and a boosting unit which boosts the brake fluid pressure in the second wheel cylinder without boosting the brake fluid pressure in the first wheel cylinder.

According to the brake fluid pressure control device for the bar handle vehicle, since the pressure of the second wheel cylinder of one brake system can be boosted by the boosting unit, it is possible to execute the interlocked brake control for allowing the braking force to be generated in the brake of the one brake system in interlocking relation to the operation of the brake operation element corresponding to the other brake system. Moreover, according to the invention, since it is unnecessary to boost the brake fluid pressure in the first wheel cylinder during the interlocked brake control, it becomes possible to alleviate the "rigid feeling" when the brake operation element is operated during the interlocked brake control. Namely, according to the invention, the operational feeling of the brake operation element during the interlocked brake control can be made similar to the operational feeling persisting at the time of normal braking in which the interlocked brake control is not executed.

The "one of the brake systems" may be the front wheel brake system or the rear wheel brake system.

The boosting unit may has:

a cut valve which is disposed in the second hydraulic path;

a suction channel which communicates the master cylinder with the second wheel cylinder so as to detour the cut valve; and a pump provided in the suction channel, and the boosting unit operates the pump so as to supply the brake fluid to a passage between the second wheel cylinder and the cut valve while closing the cut valve, thereby boosting the brake fluid pressure in the second wheel cylinder without boosting the brake fluid pressure in the first wheel cylinder.

To boost the brake fluid pressure in the second wheel cylinder without boosting the brake fluid pressure in the first wheel cylinder, it suffices if the pump is operated with the cut valve closed to supply the brake fluid to the second hydraulic path on a second wheel cylinder side of the cut valve via the suction channel. If the pump is operated with the cut valve closed, the pulsation of the pump is made difficult to be transmitted to the brake operation element, so that it becomes possible to improve the operational feeling when the brake operation element is additionally operated during the interlocked brake control.

According to another aspect of the invention, the brake system having the boosting unit further includes:

first and second control valve units provided in the first and second hydraulic paths, respectively;

a reservoir which stores the brake fluid; and a pressure reducing channel which connects the reservoir with the first and second control valve units, each of the first and second control valve units switches to allow and interrupt the outflow of the brake fluid from the first and second hydraulic paths to the reservoir, and the reservoir communicates with a suction side of the pump.

According to this configuration, it becomes possible to execute the antilock brake control in the brake system executing the interlocked brake control.

Furthermore, the first wheel cylinder and the second wheel cylinder may be formed in one caliper. If such an arrangement is adopted, as compared with a case where the both wheel cylinders are dispersed in different calipers, it becomes possible to reduce the number of component parts, and hence it becomes possible to lightweight the bar handle vehicle.

According to the invention, it becomes possible to improve the operational feeling when the brake operation element is additionally operated during the interlocked brake control.

DETAILED DESCRIPTION OF EXEMPLARY EMBODIMENTS OF THE PRESENT INVENTION

Figure 1:
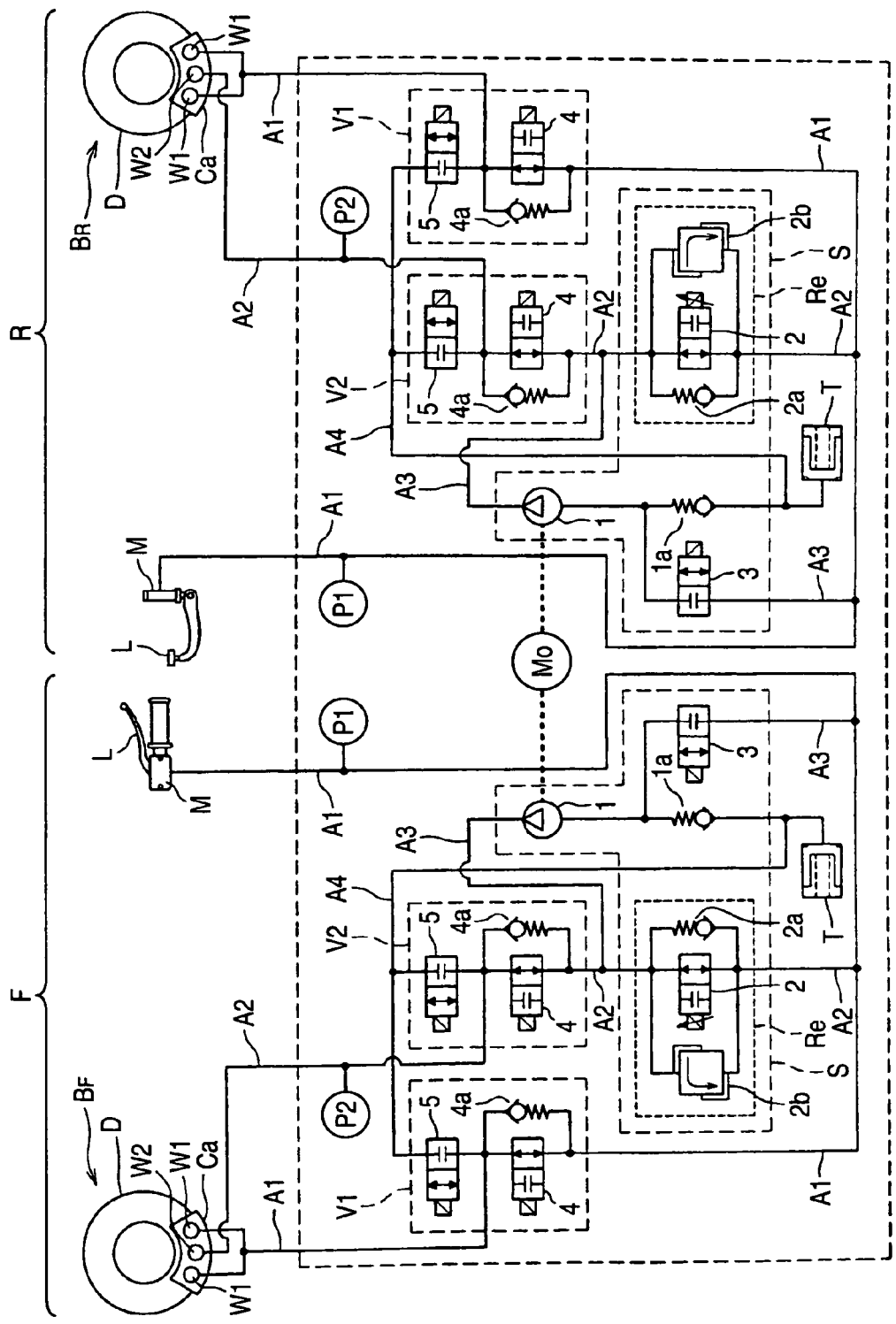
FIG. 1 is a hydraulic circuit diagram of a brake fluid pressure control device for a bar handle vehicle of an embodiment of the invention.

A brake fluid pressure control device for a bar handle vehicle of an embodiment of the invention is suitably used for a bar handle-type vehicle such as a two-wheeled motor vehicle, a three-wheeled motor vehicle, and an all terrain vehicle (ATV). As shown in FIG. 1, this brake fluid pressure control device for a bar handle vehicle is comprised of a brake system F for a front wheel which imparts a braking force to a front wheel brake $B_F$, a brake system R for a rear wheel which imparts a braking force to a rear wheel brake $B_R$, and an unillustrated control unit for executing such as interlocked brake control for interlocking the both brakes $B_F$ and $B_R$ and antilock brake control of the both brakes $B_F$ and $B_R$.

Since in this embodiment the hydraulic circuits of the both brake systems F and R are identical, a description will be given hereafter mainly of the front wheel brake system F, and the brake system R for the rear wheel will be described, as required.

The front wheel brake system F has:

a master cylinder M for generating brake fluid pressure corresponding to an operation amount (stroke amount) of a brake operation element L;

first wheel cylinders W1, W1 which impart the brake force on the front wheel brake $B_F$;

a first hydraulic path A1 which communicates the master cylinder M with the first wheel cylinders W1, W1;

a second wheel cylinder W2 which also imparts the brake force on the front wheel brake $B_F$;

a second hydraulic path A2 which is branched from the first hydraulic path A1 and connected to the second wheel cylinder W2;

a boosting unit S which boosts the brake fluid pressure in the second wheel cylinder W2 without boosting the brake fluid pressure in the first wheel cylinder W1 (first hydraulic path A1);

a first control valve unit V1 provided in the first hydraulic path A1;

a second control valve unit V2 provided in the second hydraulic path A2;

a reservoir T which stores brake fluid;

a first pressure sensor P1 which measures the brake fluid pressure in the first hydraulic path A1; and a second pressure sensor P2 which measures the brake fluid pressure in the second hydraulic path A2.

The master cylinder M has an unillustrated cylinder connected to a tank chamber storing the brake fluid. The cylinder has an unillustrated rod piston, which causes the brake fluid to flow out to the first hydraulic path A1 by sliding in an axial direction of the cylinder by the operation of the brake operation element L.

The first wheel cylinders W1, W1 and the second wheel cylinder W2 are disposed on one side of a disk D and are formed in one floating type caliper Ca. In this embodiment, the first wheel cylinders W1, W1 are disposed on both sides of the second wheel cylinder W2.

The first hydraulic path A1 is a flow channel which communicates the master cylinder M with the two first wheel cylinders W1, W1 and the second hydraulic path A2 is a flow channel which is branched from the first hydraulic path A1 and is connected to the second wheel cylinder W2.

The boosting unit S has a pump 1, a cut valve 2, and a suction valve 3.

The pump 1 is a reciprocating pump provided in a suction channel A3 which detours the cut valve 2. The pump 1 is operated by a motor Mo, sucks the brake fluid in the master cylinder M side of the pump 1, and supplies it to the second wheel cylinder W2 side. That is, the pump 1 supplies the brake fluid to a passage between the second wheel cylinder W2 and the cut valve 2.

The suction channel A3 is a flow channel which communicates the second hydraulic path A2 on the second wheel cylinder W2 side of the cut valve 2 with the channel connected to the master cylinder M (in this embodiment, the first hydraulic path A1).

A check valve 1a for preventing the inflow of the brake fluid into the reservoir T from the suction channel A3 is interposed in the channel connecting the reservoir T to the suction channel A3.

The pump 1 is operated at the time of executing such as the interlocked brake control, hill hold control, brake assist control, and traction control which will be described later. The pump 1 supplies the brake fluid via the suction channel A3 to the second hydraulic path A2 on the second wheel cylinder W2 side of the cut valve 2. In addition, the pump 1 is also operated at the time of the antilock brake control, and delivers the brake fluid temporarily stored in the reservoir T to the second hydraulic path A2 side.

Further, the pump 1 incorporates a one-way valve which allows only inflow of the brake fluid from its suction port side to its discharge port side. Therefore, even if the brake fluid pressure on the discharge port side is higher than the brake fluid pressure on the suction port side, the brake fluid does not flow reversely. Further, a damper and an orifice (neither are shown) are provided on the discharge side of the pump 1, and the pulsation of the brake fluid discharged from the pump 1 is dampened by their cooperative action.

The motor Mo is a common power source of the pump 1 of the front wheel brake system F and the pump 1 of the brake system R for the rear wheel, and is operated in accordance with a command from the control unit.

The cut valve 2 is a normally open electromagnetic valve and opens and closes the second hydraulic path A2 on the master cylinder M side of a connecting portion between the second hydraulic path A2 and the suction channel A3. In the normally open electromagnetic valve of the cut valve 2, an electromagnetic coil for driving its valve element is electrically connected to the control unit. This normally open electromagnetic valve is closed when the electromagnetic coil is energized in accordance with a command from the control unit, and is opened when it is de-energized.

The cut valve 2 in this embodiment is a linear type electromagnetic valve capable of controlling the valve opening pressure. The cut valve 2 is automatically opened when a value in which the brake fluid pressure on the master cylinder M side of the cut valve 2 is subtracted from the brake fluid pressure on the wheel cylinder W2 thereof reaches a set valve opening pressure. Namely, the cut valve 2 also functions as a relief valve 2b which adjusts to not more than a set value the brake fluid pressure of the second hydraulic path A2 on the second control valve unit V2 side of the cut valve 2. The valve opening pressure of the cut valve 2 (valve opening pressure of the relief valve 2b) can be increased or decreased by controlling the magnitude of an electric current value imparted to the electromagnetic coil.

The cut valve 2, together with a check valve 2a provided parallel to the cut valve 2, makes a regulator Re. The check valve 2a is a one-way valve which allows only the inflow of the brake fluid from the master cylinder M side to the second control valve unit V2 side.

The regulator Re adjusts magnitude of the brake fluid pressure on the second control valve unit V2 side (second wheel cylinder W2 side) of the regulator Re. The regulator Re in this embodiment has the functions of:
opening or closing the second hydraulic path A2 (cut valve 2);
adjusting to not more than a set value the brake fluid pressure in the second hydraulic path A2 (relief valve 2b); and
allowing the inflow of the brake fluid into the second control valve unit V2 side when the brake fluid pressure on the master cylinder M side has become greater than the brake fluid pressure on the second control valve unit V2 side (check valve 2a).

In this embodiment, the function of the relief valve 2b is added to the cut valve 2 which is a linear type electromagnetic valve. However, when the cut valve 2 is not a electromagnetic valve of a linear type, it suffices if a relief valve which opens by a predetermined differential pressure is provided parallel to the cut valve 2.

The suction valve 3 opens and closes the suction channel A3 on the suction side of the pump 1, and in this embodiment the suction valve 3 is a normally closed electromagnetic valve. Namely, the suction valve 3 switches between the state of opening the suction channel A3 and the state of closing the same, and if the suction valve 3 is set in the open state, the master cylinder M and the suction port of the pump 1 are set in a communicating state. In the normally closed electromagnetic valve of the suction valve 3, an electromagnetic coil for driving its valve element is electrically connected to the control unit, and this normally closed electromagnetic valve is opened when the electromagnetic coil is energized in accordance with a command from the control unit, and is closed when it is de-energized.

The first control valve unit V1 is provided for adjusting the magnitude of the brake fluid pressure applied to the first wheel cylinders W1, W1 and is connected to a pressure reducing channel A4 leading to the reservoir T. The first control valve unit V1 changeovers between a state in which the outflow of the brake fluid to the pressure reducing channel A4 is allowed and a state in which it is prevented.

The first control valve unit V1 in this embodiment includes two inlet valves 4, two check valves 4a, and two outlet valves 5. The first control valve unit V1 changeovers among:
the state of preventing the outflow of the brake fluid to the pressure reducing channel A4 while opening the first hydraulic path A1 (pressure-increased state);
the state of allowing the outflow of the brake fluid to the pressure reducing channel A4 while closing the first hydraulic path A1 (pressure-decreased state); and
the state of preventing the outflow of the brake fluid to the pressure reducing channel A4 while closing the first hydraulic path A1 (pressure-holding state).

The inlet valve 4 is constituted by a normally open electromagnetic valve provided in the first hydraulic path A1. In the normally open electromagnetic valve constituting the inlet valve 4, an electromagnetic coil for driving its valve element is electrically connected to the control unit, and this normally open electromagnetic valve is closed when the electromagnetic coil is energized in accordance with a command from the control unit, and is opened when it is de-energized.

The check valve 4a is a one-way valve provided parallel to the inlet valve 4, and allows only the inflow of the brake fluid from its wheel cylinder W1 side to the master cylinder M side.

The outlet valve 5 is a normally closed electromagnetic valve provided in the channel communicating the first hydraulic path A1 with the pressure reducing channel A4. In the normally closed electromagnetic valve of the outlet valve 5, an electromagnetic coil for driving its valve element is electrically connected to the control unit, and this normally closed electromagnetic valve is opened when the electromagnetic coil is energized in accordance with a command from the control unit, and is closed when it is de-energized.

The second control valve unit V2 is provided for adjusting the magnitude of the brake fluid pressure applied to the second wheel cylinder W2. The second control valve unit V2 is connected to the pressure reducing channel A4, and changeovers between a state in which the outflow of the brake fluid to the pressure reducing channel A4 is allowed and a state in which it is prevented. Since the second control valve unit V2 has the same configuration as that of the first control valve unit V1, a detailed description thereof will be omitted.

The reservoir T is provided at a terminating point of the pressure reducing channel A4 and temporarily stores the brake fluid which is allowed to escape as a result of the opening of the respective outlet valves 5. In addition, the reservoir T communicates with the suction side of the pump 1, and the brake fluid stored in the reservoir T is sucked out by the pump 1 and is recirculated into the second hydraulic path A2.

The first pressure sensor P1 is provided in a channel which communicates with the first hydraulic path A1 on the master cylinder M side of the first control valve unit V1. The first pressure sensor P1 directly measures the brake fluid pressure in the first hydraulic path A1, but the brake fluid pressure obtained by the first pressure sensor P1 can be regarded as the brake fluid pressure generated by the master cylinder M. The brake fluid pressure measured by the first pressure sensor P1 (hereafter referred to as the "master pressure") is fetched, as required, into the control unit and is used for various control purposes such as the interlocked brake control.

The second pressure sensor P2 is provided in a channel which communicates with the second hydraulic path A2 on the second wheel cylinder W2 side of the second control valve unit V2. The second pressure sensor P2 directly measures the brake fluid pressure in the second hydraulic path A2, but the brake fluid pressure obtained by the second pressure sensor P2 can be regarded as the brake fluid pressure which is applied to the second wheel cylinder W2. The brake fluid pressure measured by the second pressure sensor P2 (hereafter referred to as the "wheel pressure") is fetched, as required, into the control unit and is used for various control purposes such as the interlocked brake control.

The unillustrated control unit controls the on/off operation of the pump 1 (directly, the motor Mo) as well as the opening and closing of the cut valve 2, the suction valve 3, the inlet valves 4, and the outlet valves 5 on the basis of various physical quantities such as the wheel velocity outputted from a wheel velocity sensor (not shown), the master pressure, and the wheel pressure. The control unit has a central processing unit (CPU), a RAM, a ROM, and an input/output circuit (none of which are shown), and executes such as the interlocked brake control and antilock brake control by performing arithmetic processing on the basis of the aforementioned physical quantities, as well as a control program, various threshold values (reference values), and the like stored in the ROM.

Although not shown, the pump 1, the various electromagnetic valves, the reservoir T, a housing accommodating the control unit, the motor Mo, and the like are assembled in a block-like base body in which channel paths for the brake fluid are formed.

According to the brake fluid pressure control device for the bar handle vehicle of the invention which is configured as described above, it is possible to generate a braking force corresponding to the operation of the brake operation element L and execute such as the interlocked brake control, antilock brake control, hill hold control, brake assist control, and traction control.

First, a description will be given of the state of the hydraulic circuit and the operating condition of the brake fluid in the state of normal setting for generating a braking force corresponding to the operation of the brake operation element L (state in which the interlocked brake control nor antilock brake control is not executed).

Figure 2:
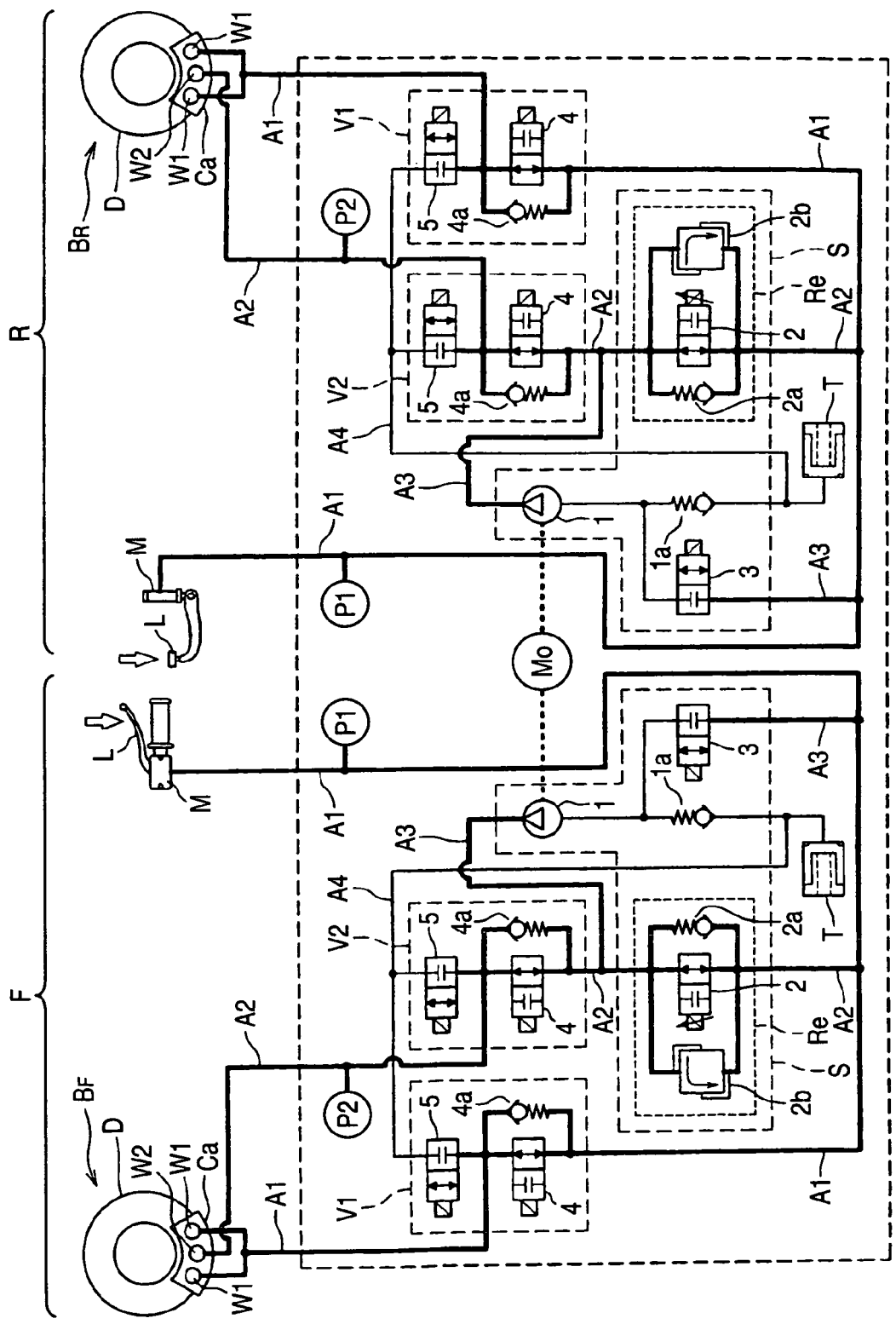
FIG. 2 is a diagram for explaining the state of a hydraulic circuit and the operating condition of the brake fluid pressure in a normal set condition.

When the state of normal setting is selected by the control unit, all the electromagnetic coils are in the de-energized state, as shown in FIG. 2, and the motor Mo (pump 1) is also in a standstill state. Namely, in the state of normal setting, the cut valve 2 and the inlet valves 4 are open, and the suction valve 3 and the outlet valves 5 are closed. Thus, when the driver operates the brake operation element L, the brake fluid pressure generated by the master cylinder M is directly applied to the first wheel cylinders W1, W1 via the first hydraulic path A1, and is directly applied to the second wheel cylinder W2 via the second hydraulic path A2. In consequence, a braking force corresponding to the operation amount of the brake operation element L is imparted to the front wheel brake $B_F$.

Next, a description will be given of the state of the hydraulic circuit and the operating condition of the brake fluid during the interlocked brake control.

The interlocked brake control is executed in a case where one brake operation element L has been operated (i.e., in a case where the master pressure generated by the operation of one brake operation element L has reached a predetermined value or greater) in a state in which the other brake operation element L has not been operated (including a case where the master pressure generated by the operation of the other brake operation element L is small). Hereafter, a description will be given by assuming a case where the brake operation element L for the rear wheel has been operated in a state in which the brake operation element L for the front wheel has not been operated.

Figure 3:
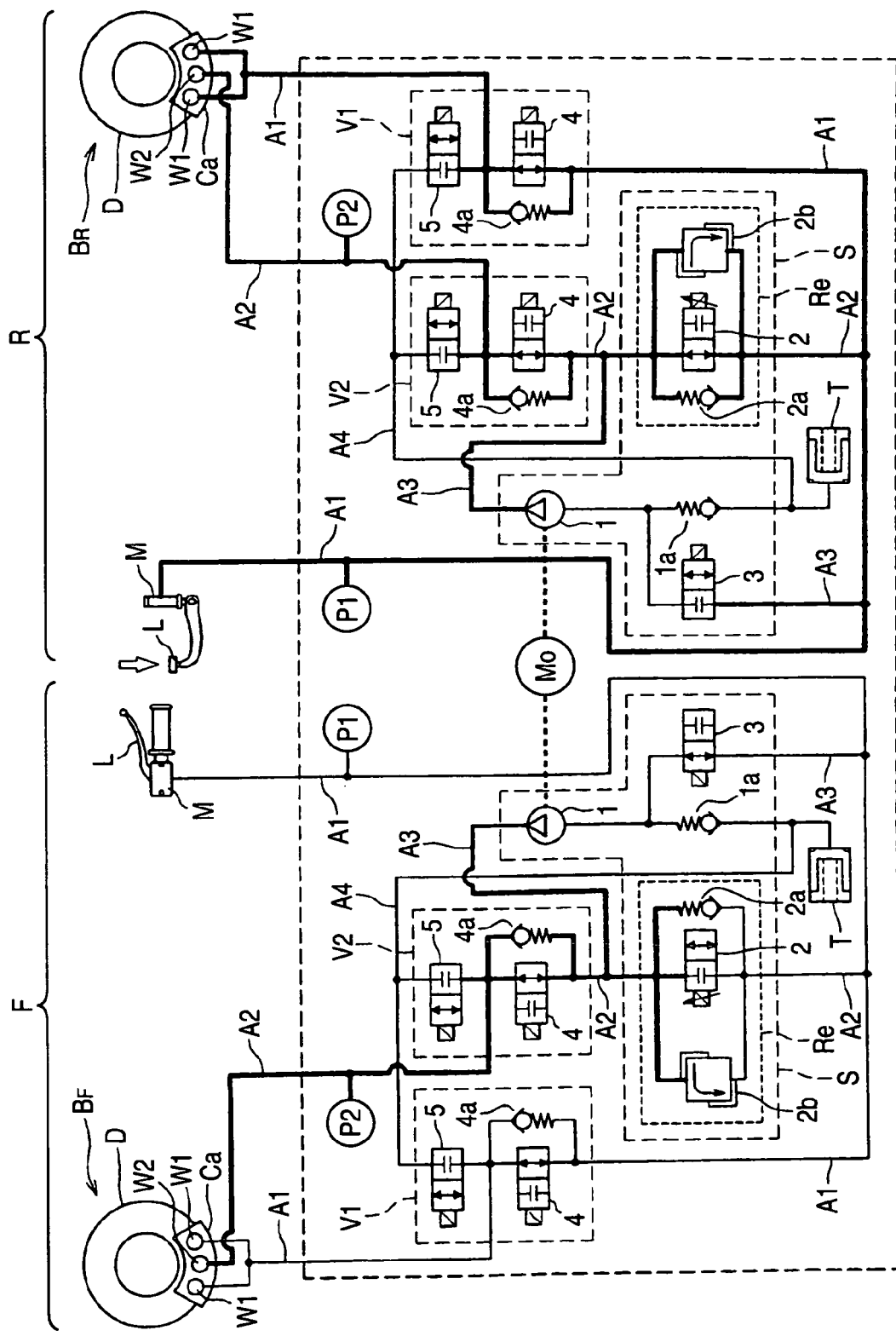
FIG. 3 is a diagram for explaining the state of the hydraulic circuit and the operating condition of the brake fluid pressure during interlocked brake control and hill hold control.

When the interlocked brake control is executed on the front wheel brake system F, the electromagnetic coils corresponding to the cut valve 2 and the suction valve 3 in the brake system F are energized, so that, as shown in FIG. 3, the cut valve 2 is closed, the suction valve 3 is opened, and the pump 1 (directly, the motor Mo) is operated. The electromagnetic coils corresponding to the inlet valve 4 and the outlet valve 5 are set in a de-energized state, so that the inlet valve 4 is opened, and the outlet valve 5 is closed.

If the pump 1 is operated with the cut valve 2 closed and the suction valve 3 open, the brake fluid sucked into the pump 1 through the suction channel A3 is supplied to the second hydraulic path A2 side to boost the brake fluid pressure in the second hydraulic path A2 on the second wheel cylinder W2 side of the cut valve 2 and boost the brake fluid pressure in the second wheel cylinder W2, as a result, braking force is imparted to the front wheel brake $B_F$.

During the interlocked brake control, a target wheel pressure in the front wheel brake system F is calculated on the basis of the master pressure or the wheel pressure in the brake system R for the rear wheel, and the valve opening pressure of the cut valve 2 (i.e., the relief pressure of the regulator Re) is set to the target wheel pressure. Accordingly, when the brake fluid pressure in the second hydraulic path A2 becomes greater than the target wheel pressure, the brake fluid in the second hydraulic path A2 flows out to the master cylinder M side through the regulator Re by virtue of the pressure regulating function of the regulator Re (cut valve 2), so that the brake fluid pressure of the second wheel cylinder W2 (second hydraulic path A2) is kept at the target wheel pressure.

In addition, when the interlocked brake control is completed, the electromagnetic coils corresponding to the cut valve 2 and the suction valve 3 are de-energized, so that the cut valve 2 is opened, the suction valve 3 is closed, and the brake fluid in the second hydraulic path A2 passes through the cut valve 2 and is recirculated to the master cylinder M. Hence, the brake fluid pressure applied to the second wheel cylinder W2 is speedily reduced.

Incidentally, if the brake operation element L for the front wheel is operated while the interlocked brake control is being executed on the front wheel brake system F, a brake fluid pressure corresponding to its amount of stroke is generated in the master cylinder M. However, since the inlet valve 4 of the first hydraulic path A1 is open and the outlet valve 5 thereof is closed, the brake fluid pressure generated in the master cylinder M is directly applied to the first wheel cylinders W1, W1 through the first hydraulic path A1, so that a braking force corresponding to the operation amount of the brake operation element L is added to the braking force imparted to the front wheel brake $B_F$ by the interlocked brake control.

During the interlocked brake control, since the cut valve 2 is closed, in the state of normal use, the brake fluid pressure generated by the operation of the brake operation element L is not imparted to the second wheel cylinder W2. In addition, during the interlocked brake control, pulsation occurs in consequence of the reciprocating motion of the plunger in the pump 1, but since the cut valve 2 is closed, the pulsation transmitted to the brake operation element L is extremely small.

Although a detailed description will be omitted, the same applies to a case where the brake operation element L for the front wheel has been operated in the state in which the brake operation element L for the rear wheel is not operated.

Next, a description will be given of the state of a hydraulic pressure circuit and the operating condition of brake fluid pressure at the time of the antilock brake control.

The anti-lock brake control is executed when a wheel is falling into a locked state. The anti-lock brake control is realized by decreasing, increasing, or holding to a fixed level the brake fluid pressure acting in the first wheel cylinders W1, W1 and the second wheel cylinder W2 by controlling the first control valve unit V1 and the second control valve unit V2 in a brake system which is falling into a locked state. Selection of any one of modes of pressure decreasing, increasing, and holding is judged by a control unit on the basis of a wheel speed obtained from an unillustrated wheel speed sensor. In the description below, a description will be given by assuming a case where only the brake operation element L for the front wheel has been operated, and the antilock brake control has been executed on the front wheel brake system F.

Figure 4:
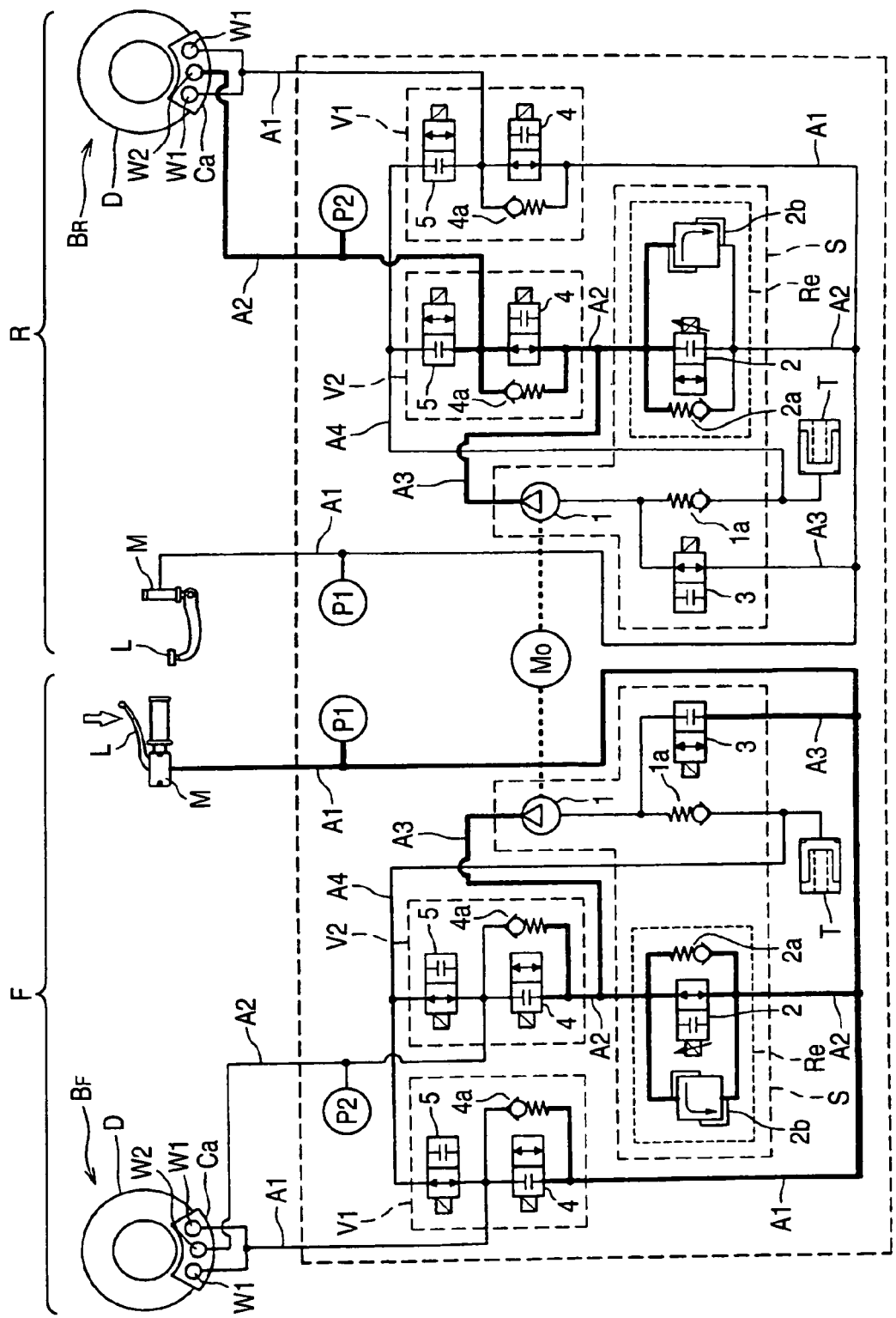
FIG. 4 is a diagram for explaining the state of the hydraulic circuit and the operating condition of the brake fluid pressure during antilock brake control.

In the antilock brake control on the front wheel brake system F, when a mode for decreasing the brake fluid pressure to be imparted to the respective wheel cylinders W1 and W2 is executed in the antilock brake control on the front wheel brake system F, the inlet valve 4 is closed and the outlet valve 5 is opened in the first control valve unit V1 and the second control valve unit V2, as shown in FIG. 4. By so doing, since the brake fluid on the side closer to the front wheel brake $B_F$ than to the inlet valve 4 passes through the pressure reducing channel A4 and flows into the reservoir T, the brake fluid pressure acting in the respective wheel cylinders W1 and W2 is depressurized. When the antilock brake control is executed, the pump 1 (directly speaking, the motor Mo) is operated to recirculate the brake fluid stored in the reservoir T to the second hydraulic path A2.

When only the brake operation element L for the front wheel is operated, the interlocked brake control is executed on the brake system R of the rear wheel. This interlocked brake control is continued even after the antilock brake control is executed on the front wheel brake system F.

When a mode for holding the brake fluid pressure to be imparted to the respective wheel cylinders W1 and W2 is executed in the antilock brake control on the front wheel brake system F, the inlet valve 4 and the outlet valve 5 are closed in the first control valve unit V1 and the second control valve unit V2, respectively, although illustration is omitted. By so doing, since the brake fluid is sealed in the flow channels closed by the inlet valve 4 and the outlet valve 5, the brake fluid pressure acting in the respective wheel cylinders W1 and W2 is held.

When a mode for increasing the brake fluid pressure to be imparted to the respective wheel cylinders W1 and W2 is executed in the antilock brake control on the front wheel brake system F, the inlet valve 4 is opened, and the outlet valve 5 is closed. By so doing, in the same way as shown in FIG. 2, the brake fluid pressure generated in the master cylinder M due to the operation of the brake operation element L is imparted to the first wheel cylinders W1, W1 via the first hydraulic path A1, and is also imparted to the second wheel cylinder W2 via the second hydraulic path A2, so that the brake fluid pressure in the respective wheel cylinders W1 and W2 is increased.

Next, a description will be given of the state of a hydraulic circuit in the hill hold control and the operating condition of brake fluid pressure.

The hill hold control is executed to control such as backing off on an uphill and sudden starting on a downhill or a level ground and to assist smooth starting of a bar handle vehicle, and is executed when the bar handle vehicle is brought to a standstill.

A description will be given below by assuming a case where the two brake operation elements L, L for the front and rear wheels have been simultaneously operated, or the brake operation element L for the front wheel is released after the bar handle vehicle is brought to a standstill by imparting braking forces to the both front and rear brakes $B_F$ and $B_R$ by the interlocked brake control.

When the hill hold control is executed on the front wheel brake system F, the cut valve 2 is closed, and the suction valve 3 is opened (i.e., is set in the state of the hydraulic circuit shown in FIG. 3), thereby holding the brake fluid pressure in the second wheel cylinder W2 (second hydraulic path A2) Since the brake operation element L for the front wheel has been released, the brake fluid pressure in the first wheel cylinders W1, W1 (first hydraulic path A1) of the brake system F is speedily depressurized.

When the hill hold control is executed, since the valve opening pressure of the cut valve 2 is set to a predetermined target holding pressure, when the brake fluid pressure (wheel pressure) acquired by the second pressure sensor P2 of the front wheel brake system F is not less than a targeted holding pressure prescribed in advance, the wheel pressure becomes equal to the targeted holding pressure by virtue of the pressure regulating function of the regulator Re (cut valve 2) If the cut valve 2 is closed in a state in which the brake fluid pressure in the second wheel cylinder W2 is reduced to a targeted holding pressure, it becomes possible to reduce electric power required for keeping the cut valve 2 closed. In addition, when the wheel pressure of the front wheel brake system F is smaller than the targeted holding pressure, the cut valve 2 is closed, and the pump 1 is operated until the wheel pressure becomes equal to the targeted holding pressure while the open state of the suction valve 3 is being maintained.

Next, a description will be given of the state of the hydraulic circuit and the operating condition of the brake fluid in the brake assist control.

The brake assist control is executed when an emergency brake operation has been performed (e.g., when the boost rate of the master pressure (brake fluid pressure measured by the first pressure sensor P1) is not less than a predetermined threshold value), and when a determination is made that there is a need to generate a brake fluid pressure greater than the brake fluid pressure generated by the braking operation by the operator.

Hereafter, a description will be given by assuming a case in which an emergency braking operation has been performed only on the brake operation element L for the front wheel, and in which a determination is made that there is a need to generate a brake fluid pressure greater than the brake fluid pressure generated by the master cylinder M in correspondence with the operation amount of the brake operation element L for the front wheel.

Figure 5:
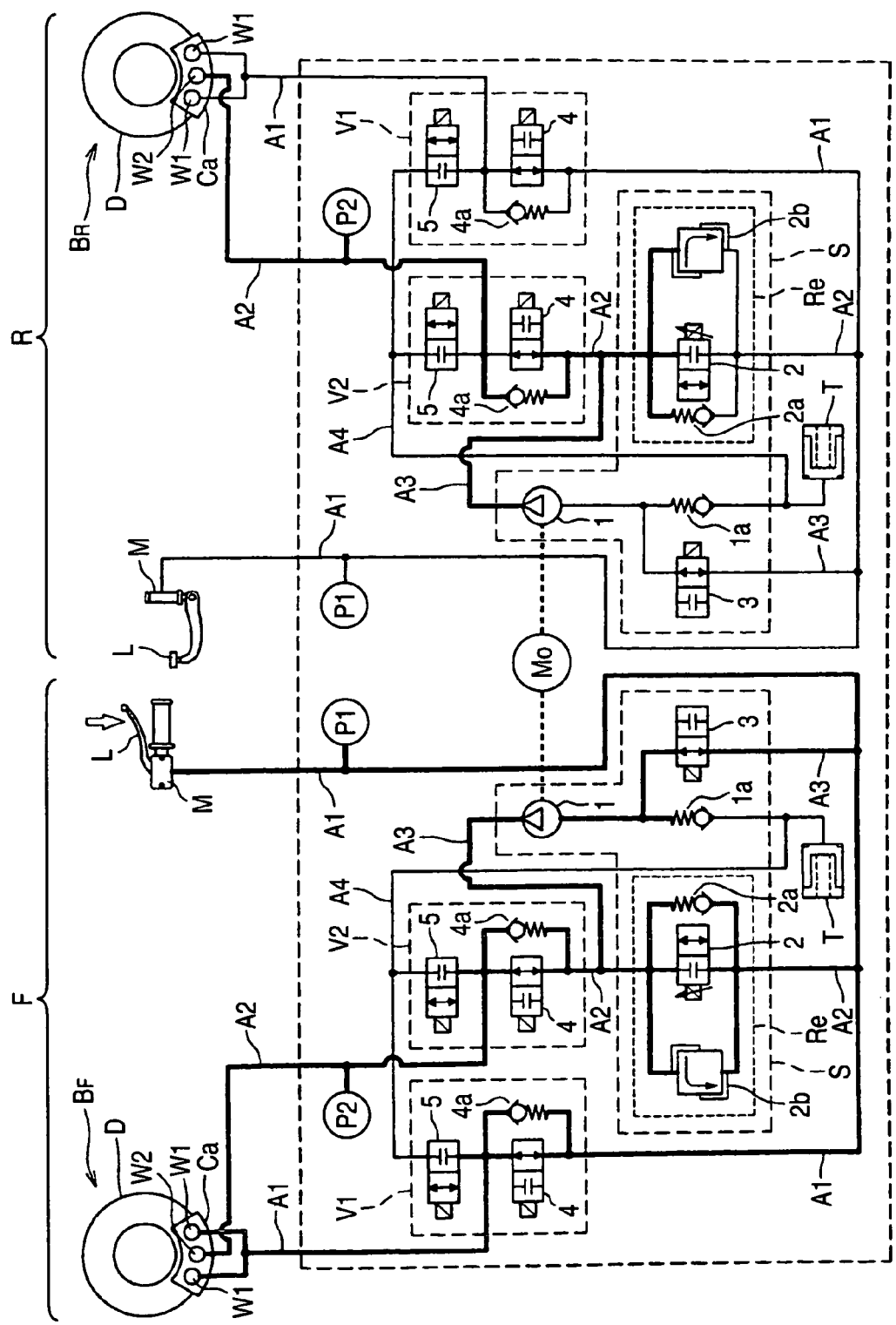
FIG. 5 is a diagram for explaining the state of the hydraulic circuit and the operating condition of the brake fluid pressure during brake assist control.

If the brake assist control is executed on the front wheel brake system F, electromagnetic coils corresponding to the cut valve 2 and the suction valve 3 are set in an energized state, so that the cut valve 2 is closed, and the suction valve 3 is opened, as shown in FIG. 5, and the pump 1 (motor Mo) is operated. If the pump 1 is operated with the cut valve 2 closed and the suction valve 3 open, the brake fluid pressure in the second wheel cylinder W2 (second hydraulic path A2) boosted due to the operation of the brake operation element L is further boosted. Meanwhile, since the brake fluid pressure generated in the master cylinder M in correspondence with the operation amount of the front wheel brake operation element L acts on the first wheel cylinders W1, W1 through the first hydraulic path A1, a braking force greater than the braking force produced due to the operation of the brake operation element L is imparted to the front wheel brake $B_F$. When the wheel is falling into a locked state, the antilock brake control is executed through the brake assist control.

Incidentally, although pulsation ascribable to the operation of the pump 1 is generated during the brake assist control, since the cut valve 2 is closed, the pulsation which is transmitted to the brake operation element L is extremely small.

In addition, when an emergency brake operation has been performed only on the front wheel brake operation element L, the interlocked brake control for the brake system R for the rear wheel may be executed in parallel with the brake assist control for the front wheel brake system F. In such a case, targeted wheel pressure in the interlocked brake control may preferably be set to be greater than targeted wheel pressure in a case where the brake assist control is not executed.

Finally, a description will be given of the state of the hydraulic circuit and the operating condition of the brake fluid pressure in the traction control.

The traction control is executed when slippage has occurred to the rear wheel, which is a driving wheel, in a state in which the brake operation element L for the rear wheel has not been operated, such as during starting or acceleration.

Figure 6:
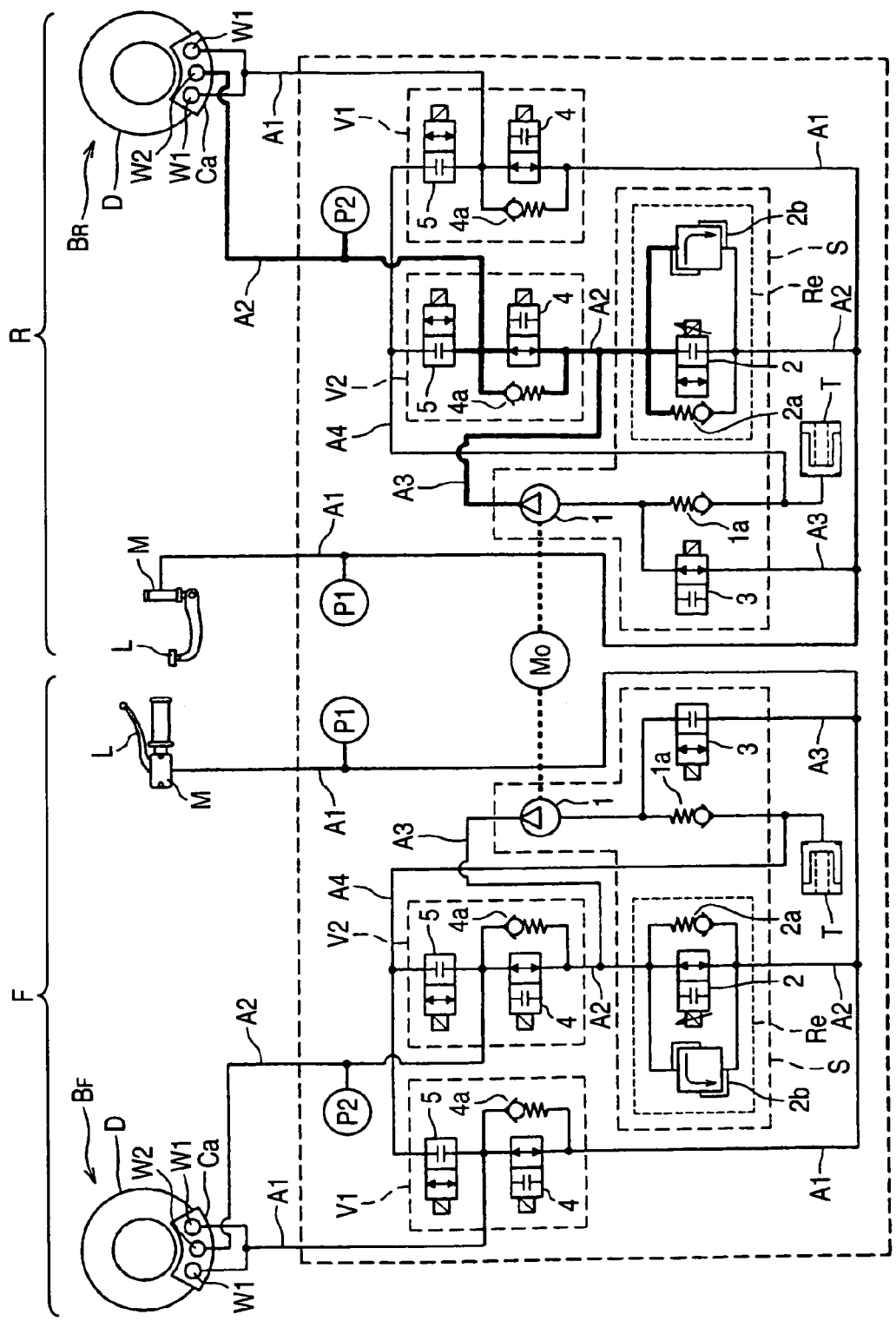
FIG. 6 is a diagram for explaining the state of the hydraulic circuit and the operating condition of the brake fluid pressure during traction control.

When the traction control is executed, as shown in FIG. 6, in the brake system R for the rear wheel, the cut valve 2 is closed, the suction valve 3 is opened and the pump 1 (motor Mo) is operated. If the pump 1 is operated with the cut valve 2 closed and the suction valve 3 open, only the brake fluid pressure in the second hydraulic path A2 is boosted to impart a braking force to the rear wheel brake $B_F$. Consequently, the slippage of the rear wheel is suppressed.

According to the brake fluid pressure control device for the bar handle vehicle of the above-described embodiment, the brake fluid pressure in the second hydraulic path A2 connected to the second wheel cylinder W2 can be boosted by the boosting unit S in the respective ones of the brake systems F and R, so that it is possible to execute various control including the interlocked brake control. Moreover, according to this embodiment, since it is unnecessary to boost the brake fluid pressure in the first wheel cylinders W1, W1 during the interlocked brake control, it becomes possible to alleviate the "rigid feeling" when the brake operation element L is operated during the interlocked brake control. Namely, according to this embodiment, the operational feeling of the brake operation element L during the interlocked brake control can be made similar to the operational feeling persisting at the time of normal braking in which the interlocked brake control is not executed.

In addition, since the pump 1 is operated with the cut valve 2 closed when the interlocked brake control or the brake assist control is executed, the pulsation of the pump 1 is made difficult to be transmitted to the brake operation element L. Namely, according to the brake fluid pressure control device for the bar handle vehicle of this embodiment, it becomes possible to improve the operational feeling when the brake operation element L is additionally operated during the interlocked brake control or the operational feeling of the brake operation element L when the brake assist control has intervened.

In addition, according to the brake fluid pressure control device for the bar handle vehicle of this embodiment, the first wheel cylinders W1, W1 and the second wheel cylinder W2 are formed in one caliper Ca. Therefore, as compared with a case where these members are dispersed in different calipers, it becomes possible to reduce the number of component parts, and hence it becomes possible to render the bar hand vehicle lightweight.

Further, although in this embodiment, the brake fluid pressure control device for the bar handle vehicle has been exemplified which is capable of performing the interlocked brake control and the like for each of the brake systems F and R, the invention is not limited to the same. The brake fluid pressure control device for the bar handle vehicle, although not shown, may perform the interlocked brake control and the like only for either one of the brake systems F and R.

Furthermore, although in this embodiment, the floating type caliper Ca has been illustrated in which the first wheel cylinders W1, W1 and the second wheel cylinder W2 are disposed on one side of the disk D, the type of the caliper to which the invention is applicable and the number of wheel cylinders (number of pods) are not limited insofar as at least two wheel cylinders are provided on one side of the disk D. If the caliper is an opposed piston-type (fixed type) caliper in which wheel cylinders are respectively disposed on both sides of the disk, it is preferred that the number of the wheel cylinders be an even number of 4 or more, that the pair of first wheel cylinders connected to the first hydraulic path A1 be opposed to each other, and that the pair of second wheel cylinders connected to the second hydraulic path A2 be opposed to each other.

While the invention has been described in connection with the exemplary embodiments, it will be obvious to those skilled in the art that various changes and modifications may be made therein without departing from the present invention, and it is aimed, therefore, to cover in the appended claim all such changes and modifications as fall within the true spirit and scope of the present invention.

What is claimed is:

1. A brake fluid pressure control device for a bar handle vehicle comprising:
    a front wheel brake system which imparts a braking force to a front wheel; and
    a rear wheel brake system which imparts a braking force to a rear wheel,
        wherein at least one of the brake systems comprises:
        a master cylinder which generates brake fluid pressure in accordance with an operation amount of a brake operation element;
        first and second wheel cylinders both of which impart the brake force on one of the front and rear wheels;
        a first hydraulic path which communicates the master cylinder with the first wheel cylinders;
        a second hydraulic path which is branched from the first hydraulic path and connected to the second wheel cylinder; and
    a boosting unit which boosts the brake fluid pressure in the second wheel cylinder without boosting the brake fluid pressure in the first wheel cylinder, wherein
    the boosting unit comprises:
        a cut valve which is disposed in the second hydraulic path;
        a suction channel which communicates the master cylinder with the second wheel cylinder so as to detour the cut valve; and
        a pump provided in the suction channel, and
        the boosting unit operates the pump so as to supply the brake fluid to a passage between the second wheel cylinder and the cut valve while closing the cut valve, thereby boosting the brake fluid pressure in the second wheel cylinder without boosting the brake fluid pressure in the first wheel cylinder.

2. The brake fluid pressure control device for the bar handle vehicle according to claim 1, wherein
    the brake system having the boosting unit further comprises:
        first and second control valve units provided in the first and second hydraulic paths, respectively;
        a reservoir which stores the brake fluid; and a pressure reducing channel which connects the reservoir with the first and second control valve units, each of the first and second control valve units switches to allow and interrupt the outflow of the brake fluid from the first and second hydraulic paths to the reservoir, and the reservoir communicates with a suction side of the pump.

3. The brake fluid pressure control device for the bar handle vehicle according to claim 1, wherein the first and second wheel cylinders are formed in one caliper.

4. The brake fluid pressure control device for the bar handle vehicle according to claim 1, wherein the brake system having the boosting unit is the front wheel brake system.

5. The brake fluid pressure control device for the bar handle vehicle according to claim 1, wherein the brake system having the boosting unit is the rear wheel brake system.

6. The brake fluid pressure control device for the bar handle vehicle according to claim 1, wherein the two first wheel cylinders are positioned on opposing sides of the second wheel cylinder.

7. The brake fluid pressure control device for the bar handle vehicle according to claim 1, further comprising:

a first control valve unit provided in the first hydraulic path;

a second control valve unit provided in the second hydraulic path;

a reservoir which stores brake fluid;

a first pressure sensor which measures the brake fluid pressure in the first hydraulic path; and a second pressure sensor which measures the brake fluid pressure in the second hydraulic path.

8. The brake fluid pressure control device for the bar handle vehicle according to claim 7, further comprising:

wherein the first control valve unit is provided for adjusting a magnitude of the brake fluid pressure applied to two first wheel cylinders, and connects to a pressure reducing channel leading to the reservoir, the first control valve unit provides changeovers between:

a pressure-increased state which comprises preventing outflow of the brake fluid to the pressure reducing channel while opening the first hydraulic path;

a pressure-decreased state which comprises allowing the outflow of the brake fluid to the pressure reducing channel while closing the first hydraulic path; and a pressure-holding state which comprises preventing the outflow of the brake fluid to the pressure reducing channel while closing the first hydraulic path; and the second control valve unit is provided for adjusting a magnitude of the brake fluid pressure applied to the second wheel cylinder, and connects to the pressure reducing channel, the second control valve unit further provides changeovers between a state in which the outflow of the brake fluid to the pressure reducing channel is allowed and a state in which it is prevented.

9. The brake fluid pressure control device for the bar handle vehicle according to claim 7, wherein:

the first pressure sensor is provided in a channel which communicates with the first hydraulic path on a master cylinder side of the first control valve unit; and the first pressure sensor directly measures the brake fluid pressure in the first hydraulic path;

the second pressure sensor is provided in a channel which communicates with the second hydraulic path on a second wheel cylinder side of the second control valve unit; and the second pressure sensor directly measures the brake fluid pressure in the second hydraulic path.

10. The brake fluid pressure control device for the bar handle vehicle according to claim 1, wherein the boosting unit includes the pump, the cut valve, and a suction valve.

11. The brake fluid pressure control device for the bar handle vehicle according to claim 10, wherein the pump is a reciprocating pump provided in a suction channel which detours the cut valve.

12. The brake fluid pressure control device for the bar handle vehicle according to claim 11, wherein the suction channel is a flow channel which communicates the second hydraulic path on a second wheel cylinder side of the cut valve with the master cylinder.

13. The brake fluid pressure control device for the bar handle vehicle according to claim 11, further comprising a check valve interposed in a channel connecting a reservoir to the suction channel and which prevents inflow of the brake fluid into the reservoir from the suction channel.

14. The brake fluid pressure control device for the bar handle vehicle according to claim 10, wherein the cut valve is a normally open electromagnetic valve and opens and closes the second hydraulic path on a master cylinder side of a connecting portion between the second hydraulic path and the suction channel.

15. The brake fluid pressure control device for the bar handle vehicle according to claim 10, wherein:

the cut valve is a linear type electromagnetic valve structured to control a valve opening pressure; and the cut valve is automatically opened when a value in which the brake fluid pressure on the master cylinder side of the cut valve is subtracted from the brake fluid pressure on the second wheel cylinder reaches a set valve opening pressure.

16. The brake fluid pressure control device for the bar handle vehicle according to claim 10, further comprising a regulator comprising the cut valve and a check valve provided parallel to the cut valve, wherein the regulator adjusts a magnitude of the brake fluid pressure on a second wheel cylinder side of the regulator.

* * * * *